Patented Oct. 4, 1932

1,880,987

UNITED STATES PATENT OFFICE

JOHN F. SILHAVY, OF SAGINAW, MICHIGAN, ASSIGNOR TO BAKER PERKINS COMPANY, INC., OF SAGINAW, MICHIGAN, A CORPORATION OF NEW YORK

LUBRICANT FOR BEARINGS OPERATING IN HEATED ATMOSPHERE

No Drawing. Application filed August 5, 1929. Serial No. 383,789.

This invention relates to a lubricant for bearing surfaces that operate in a heated atmosphere, for instance, the pintles of conveyor chains used in traveling bake ovens.

The object of my invention is to provide a liquid vehicle which is particularly effective for carrying finely divided graphite or mica in between the wearing surfaces and is possessed of a peculiar ability to evaporate quickly and cleanly, leaving the graphite or mica without leaving any other appreciable residue when the oven is operated within its usual range of baking heats, namely, from four hundred fifty degrees Fahrenheit upwards.

After long experimentation I have discovered a liquid vehicle that meets the above requirements and provides a wholly satisfactory means for lubricating the conveyor chains of bake ovens and for other similar uses.

In practice its use over sufficiently long periods of use has demonstrated that it completely solves the problem of producing an effective lubricant for bearings that have to work in a heated atmosphere, and that it will not harden, gum or clog.

Its use avoids the expense and labor heretofore entailed in periodically taking apart and cleaning by hand the separate parts of bake oven conveyor chain bearings to remove the hard resinous accretions that were formed by lubricants heretofore employed.

The liquid vehicle which I have discovered is a light refined petroleum oil having the following characteristics: specific gravity 46.4° Baumé, flash point 150°, burn point 180°, initial boiling point 370° F., end boiling point 496° F.; at 440° F. 90 per cent of the oil will evaporate.

I prepare this vehicle for use by stirring into it finely divided graphite in suitable proportions. Two or three pounds of graphite to the gallon of oil gives good results, but the proportion of graphite is not important as it may be added up to the point where the mixture becomes too thick to penetrate between the surfaces to be lubricated.

The above mentioned oil is suitable for the stated purpose primarily because of its boiling range. The initial boiling point, 370° Fahrenheit, is high enough so it will not spatter or flash into vapor on striking the oven chains while they are at oven baking heat. It will wet the chain momentarily and run between the bearing surfaces without sizzling, carrying with it the graphite particles.

Since the end boiling point, 496° Fahrenheit, of the oil is somewhat lower than the customary bread making temperature, the oil will evaporate virtually completely within a few minutes after its application, or if it has been applied to a cold chain it will evaporate while the oven is being heated up. Since none of the oil can remain long on the chain at baking temperatures, no harmful hard, resinous or carbon residue can be formed by oxidation. At 450° Fahrenheit only a negligible amount of carbon will be formed since more than 90 per cent of the oil boils away at that temperature.

Heretofore, heavier oils used for oven chain lubrication usually possessed a high percentage of high-boiling constituents which, instead of evaporating, oxidized and built up hard carbon residue which wore the bearings and eventually caused the chain rollers to bind. So-called penetrating light oils were unsatisfactory for this kind of service, although they do not form carbon to the same extent as the heavy oils above referred to, but they do deposit an undesirable amount of resinous or carbon cake. Furthermore, penetrating oils are relatively high priced, costing four to five times as much as the lubricant herein described.

Another advantage possessed by this highly refined oil is that it has a minimum of disagreeable odor.

Standard Oil Co.'s No. 9 refined oil is a commercial product which possesses the characteristics required for the purpose of my invention. The lubricant made by mixing this oil with powdered or flake graphite may be applied to a new chain in a bake oven at least once a week, more often if necessary, until the working parts of the chain become thoroughly coated with graphite.

Then the time between lubrications may be extended, but should always be systematic. When the chain is coated thoroughly, approximately one-half pint of lubricant at each side of an ordinary oven conveyer should be sufficient, the amount depending upon the length of the chain. The lubricant should be applied while the oven is warm and empty of bread.

I do not intend to limit myself to the use of an oil having the precise specifications given above, as those specifications may vary somewhat and oils refined by different producers may vary slightly without departing from my invention as claimed.

The essential qualification is that the oil shall have an end boiling point somewhat below the operating temperature of the parts to be lubricated, in order that all of the oil shall evaporate from the lubricated surfaces quickly, affording no time for formation of solid deposits by oxidation. I find that most of the deposits on oven chains are the result of oxidation of the oil vehicle and not the residue after evaporation.

Having thus described my invention, what I claim and desire to secure by Letters Patent is:

1. A lubricant for bake oven parts comprising a mixture of finely divided graphite and petroleum oil having a specific gravity of approximately forty-six degrees Baumé, an initial boiling point above three hundred twenty five degrees Fahrenheit and an end boiling point below five hundred degrees Fahrenheit.

2. A lubricant for the heated mechanisms of bake ovens consisting of a mixture of comminuted dry lubricant and a light hydrocarbon oil having an initial boiling point of approximately three hundred seventy degrees Fahrenheit and an end boiling point of approximately five hundred degrees Fahrenheit.

In testimony whereof, I affix my signature.

JOHN F. SILHAVY.